United States Patent

Bloemen et al.

Patent Number: 6,110,539
Date of Patent: Aug. 29, 2000

[54] METHODS FOR CREATING A MAGNETICALLY PERMEABLE FILM

[75] Inventors: Pascal J.H. Bloemen; Jacobus J.M. Ruigrok, both of Eindhoven, Netherlands

[73] Assignee: U.S. Philips Corporation, New York, N.Y.

[21] Appl. No.: 09/239,137

[22] Filed: Jan. 27, 1999

[30] Foreign Application Priority Data

Jan. 28, 1998 [EP] European Pat. Off. ............... 98200250

[51] Int. Cl.⁷ ....................................................... H01F 1/00
[52] U.S. Cl. ........................... 427/547; 427/131; 427/132; 427/404; 427/419.2; 427/419.3; 427/548; 427/598; 427/599
[58] Field of Search ..................................... 427/131, 132, 427/598, 599, 547, 548, 404, 419.2, 419.3

[56] References Cited

U.S. PATENT DOCUMENTS 5,534,355  7/1996  Okuno et al. .

FOREIGN PATENT DOCUMENTS 61-61704A  7/1986  Japan ............................... H01F 41/18

*Primary Examiner*—Bernard Pianalto
*Attorney, Agent, or Firm*—Michael E. Belk

[57] ABSTRACT

A method for creating a magnetically permeable film on a substrate surface by deposition of successive layers of a magnetic material, during deposition of each layer a magnetic field being provided near said surface having a field direction substantially parallel to the surface. In order to tune the permeability of the magnetic material the method builds up the magnetically permeable film by forming each layer by depositing a ferromagnetic material to a thickness maximally corresponding to substantially $$\frac{1}{2}\pi L_{ex},$$

where $L_{ex}$ is equal to $$\sqrt{A/K_u}$$

with A being the exchange constant of the ferromagnetic material and $K_u$ being the uniaxial anisotropy constant, and changing the magnetic field direction during formation of said layer by an angle other than substantially 180°.

5 Claims, 3 Drawing Sheets

METHODS FOR CREATING A MAGNETICALLY PERMEABLE FILM

BACKGROUND OF THE INVENTION

The invention relates to a method for creating a magnetically permeable film on a surface by deposition of a magnetic material, during which deposition a magnetic field is present near said surface, which field has a field direction which is substantially parallel to the surface.

Such a method is known from JP-A 61-16174. In the known method use is made of a coil for generating a magnetic field parallel to a surface of a substrate disposed in a sputtering device. The generated magnetic field has a fixed magnetic axis. The known method aims at forming a homogeneous magnetic thin film on the substrate.

To meet requirements imposed on present-day magnetic recording and/or reproducing devices and magnetic sensing devices, much research and development have been directed to soft magnetic thin film materials uniting a number of desired physical properties which are crucial for the performance of the devices. Examples of desired material properties are a high magnetic permeability, which may be highly anisotropic or isotropic depending on the specific device requirements, a high saturation magnetization, an as low as possible magnetostriction constant, a high resistance against corrosion and wear, a low electrical conductivity at high operating frequencies, a sizeable anisotropic magnetoresistance effect or, alternatively, a large giant magnetoresistance or spin-tunnel effect in the case of multilayer devices. For the very important class of devices which are designed to detect a small magnetic field or a small change of magnetic field high-films having a high magnetic permeability are essential and indispensable.

Several different approaches have been employed to produce films with a material of a high magnetic permeability. The resulting situation that these approaches have in common appears to be one in which the magneto-crystalline anisotropy plays a negligible role for the magnetic response, the magnetostriction constant is close to zero with the purpose to prevent that magnetostrictive anistropy contributions become active, and a uniaxial magnetic anisotropy can be induced by a magnetic field either during or after manufacturing.

The magnitude of the uniaxial magnetic anisotropy is determined largely by the material composition and process steps, such as an annealing treatment. The choice of the material composition and/or the annealing treatment is not free, but is rather restricted because of other material property requirements, as mentioned above, and because of limited crystallization in the case of amorphous materials or a limited growth of existing crystals in the case of nanocrystalline-Fe.

OBJECTS AND SUMMARY OF THE INVENTION

It is an object of the invention to provide a method for creating a magnetically permeable film by depositing a soft magnetic material, which method allows the permeability of the material to be tuned during deposition.

The method in accordance with the invention is characterized by the steps of building up the magnetically permeable film by forming a magnetically permeable layer through depositing a ferromagnetic material to a thickness, maximally corresponding to substantially $$\frac{1}{2}\pi L_{ex},$$

where $L_{ex}$ is equal to $$\sqrt{A/K_u}$$

with A being the exchange constant of the ferromagnetic material, also named interatomic direct exchange constant, and $K_u$ being the uniaxial anisotropy constant, and changing the field direction of the magnetic field, with the exception of a change over solely an angle of substantially 180°, during the forming of the magnetically permeable layer. So, a key ingredient of the method in accordance with the invention is to vary the direction of the magnetic field during the growth of the magnetically permeable film in relation to its thickness. In an embodiment of the method the thickness of a formed layer should remain below at least substantially $$\frac{1}{2}\pi L_{ex},$$

wherein $L_{ex}$ is the so-called exchange length. This condition guarantees that top and bottom parts within the layer formed during the method in accordance with the invention are strongly exchange coupled. Such a coupling is essential in order to prevent the forming of a domain wall parallel to the film formed. The requirement on thickness poses no practical problems even if $K_u$—which is the composition dependent uniaxial anisotropy constant that would have resulted with a fixed orientation of the field during growth of the layer—is large, because even then $L_{ex}$ is not too small. Given the typical deposition rates, which are rather low, the time scale at which the field direction should change is even then easily attainable. It will be clear that a magnetic film which is thicker than $$\frac{1}{2}\pi L_{ex}$$

can be simply obtained by forming one or more additional layers on top of each other, e.g. by continuing the growth without interruption.

A surprising effect of the method in accordance with the invention is that the permeability of the formed magnetically permeable layer or layers and consequently the resulting magnetic permeability of the obtained magnetically permeable film can be controlled by simply varying the magnetic field orientation during growth of the layer or layers. An important consequence of the method in accordance with the invention is that the freedom in choosing magnetic materials is increased considerably since also materials with intrinsically low permeability or high $K_u$ can be used for purposes where a relatively high macroscopic permeability is required. Low permeability materials which are suitable for deposition in the method according to the invention are materials which comprise one or more of the elements Co, Fe, or Ni. Examples are e.g. the alloys $Co_{90}Fe_{10}$, $Ni_{65}Co_{35}$ and $Ni_{66}Fe_{16}Co_{18}$.

It is to be noted that a change over solely 180°, i.e. reversing of the magnetic field, does not influence the anisotropy axis in the magnetic material and therefore does not result in any improvement of the permeability.

In an embodiment of the method in accordance with the invention the formed film is obtained by growing the layer without using a non-magnetic intermediate layer. By this method, the magnetic anisotropy contributions of the successive sublayers are averaged to a value that can be controlled effectively to a desired degree by simply setting the times during which the applied field is oriented in the one and in the other direction. In general the strength of the field is maintained constant. The magnetic anisotropy of the layer is in such a case reduced by a factor $(t_1-t_2)/(t_1+t_2)$ relative to the case that both sublayers were formed in a field with a fixed direction. Here $t_1$ and $t_2$ are the deposition times—or alternatively the thicknesses—of the one and the other sublayer, respectively.

In another embodiment of the method in accordance with the invention the permeability is tuned between a lower limit imposed by the material and which is limited in principle. However in general a certain minimum anisotropy will be desired to prevent instability. For this reason it is practical not to rotate the field continuously or intermittently solely over an angle of substantially 180° in the case of equal changes of the field direction per time interval.

In still another embodiment of the method in accordance with the invention possible instabilities in the case that $K_{eff}$ approaches zero can be prevented without interrupting the rotation process. Preferably, the strength of the magnetic field is constant during the rotation of the field.

The invention further relates to a method of manufacturing a structure or a unit, wherein the novel method is applied. The structure may be a thin film structure; the unit may be a magnetic head or magnetic sensor.

Furthermore, the invention relates to a unit, in particular a magnetic head or sensor, as claimed in claim 6. The magnetic head may be a read head, e.g. suitable for reading magnetic information from a tape or disc in which the information has been recorded, e.g. magnetically or magneto-optically. The magnetic head is also suitable for writing purposes.

The invention moreover relates to equipment suitable for carrying out the method according to the invention. An advantage of the equipment according to the invention is that the electrical device does not have any moving parts in the deposition chamber. Due to this, there is less risk of contamination in the deposition chamber.

BRIEF DESCRIPTION OF DRAWINGS

The invention will now be described in more detail, by way of example, with reference to the drawings, in which.

DESCRIPTION OF THE PREFERRED EMBODIMENTS

Figure 1:
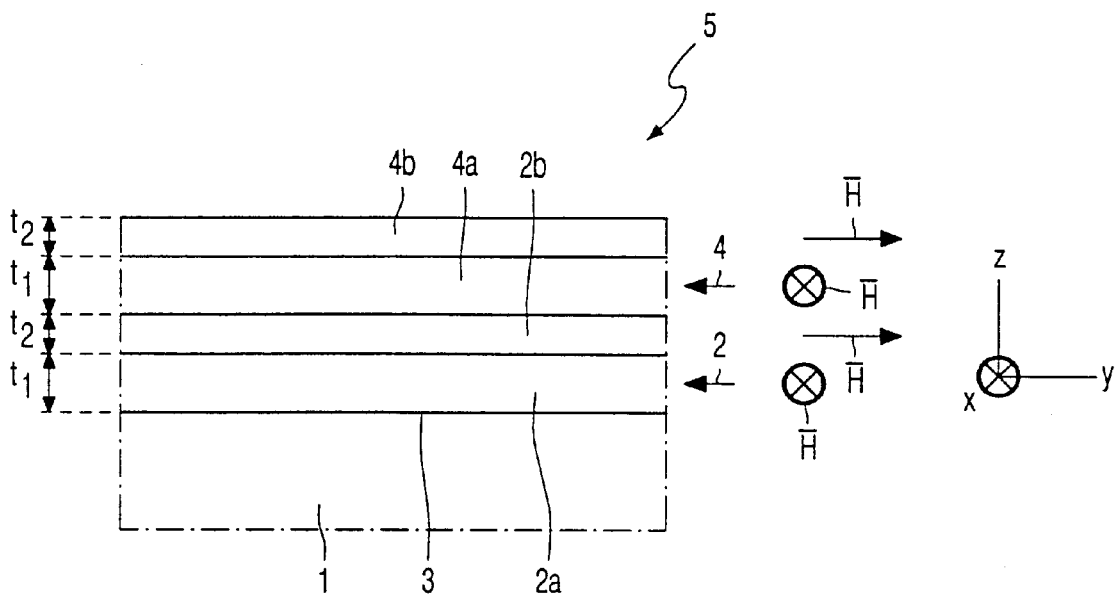
FIG. 1 is a diagrammatic cross-sectional view of an embodiment of a magnetically permeable film obtained by using the method according to the invention.

FIG. 1 shows a structure which comprises a substrate 1, e.g. of $Al_2O_3/TiC$, with a surface 3 on which a magnetically permeable thin film 5 has been formed by means of deposition, e.g. sputter deposition, during which deposition a magnetic field H parallel to the surface 3 has been maintained.

In a method according to the invention for creating a magnetically permeable film the magnetic film 5 is built-up by forming two magnetically permeable layers 2 and 4, each formed by depositing a ferromagnetic material, e.g. $Co_{90}Fe_{10}$, to a thickness corresponding to $$\frac{1}{2}\pi L_{ex},$$

while during deposition the field direction of the magnetic field H is changed in the following way. During forming of a first magnetically permeable sublayer 2a the direction of the magnetic field H is chosen according to an x-axis of an orthogonal xyz system, whereafter during forming of a second magnetically permeable sublayer 2b the direction is chosen according to a y-axis of the xyz system. Both sublayers 2a and 2b form the first layer 2. After the first layer 2 has been formed, the second layer 4 is formed in a similar way. This means that during forming of a first sublayer 4a the field direction is set according to the x-axis and during forming of a second sublayer 4b the field direction is set according to the y-axis. The thicknesses of the sublayers 2a and 4a and the sublayers 2b and 4b are $t_1$ and $t_2$, respectively, where $t_1 > t_2$ in this example. The strength of the magnetic field H is maintained constant in this example and has e.g. a value of at least 10 kA/m. Due to the applied changes in field direction during deposition of the magnetic material the magnetic anisotropy of each of the layers 2 and 4 and consequently of the resulting film 5 is reduced by a factor $(t_1-t_2)/(t_1+t_2)$ relative to a deposition situation wherein a fixed field direction is maintained.

Figure 2:
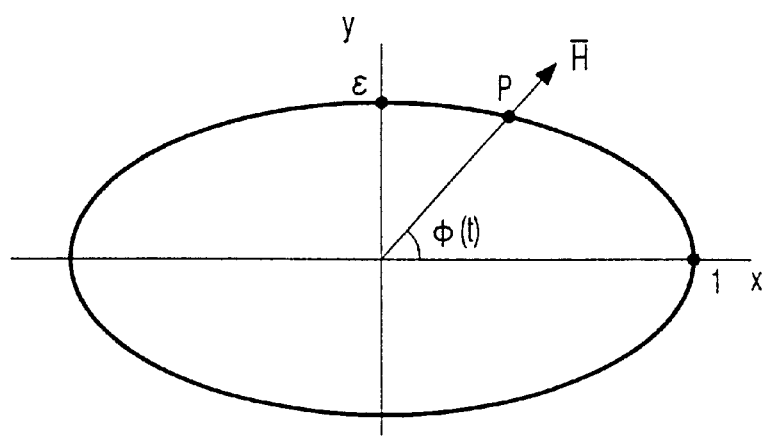
FIG. 2 is a graphic representation of a variant of the method in which the magnetic field rotates with a varying angular velocity $d\phi/dt$.
Figures 3A, 3B:
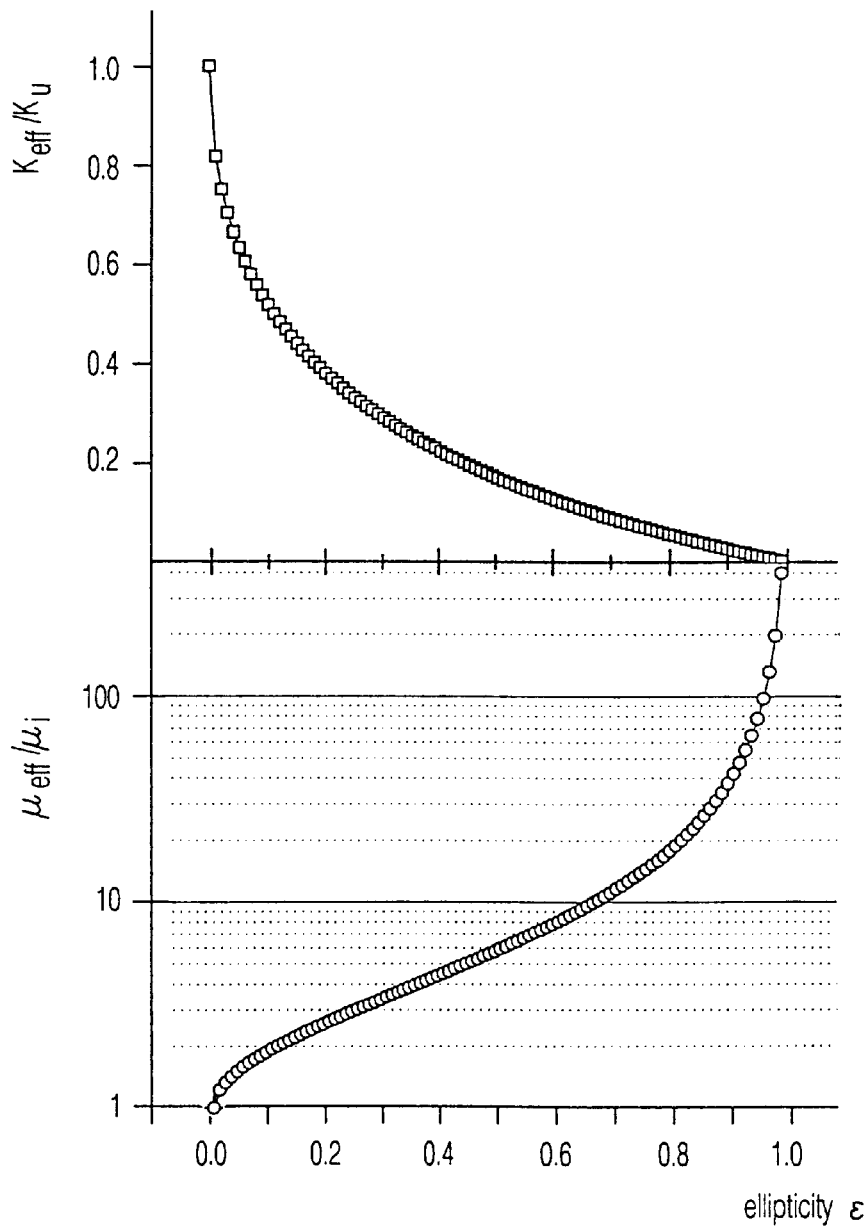
FIG. 3A is a plot of the effective anisotropy energy $K_{eff}$ normalized to the intrinsic uniaxial anisotropy energy $K_u$ as a function of the elipticity $\epsilon$.
FIG. 3B is a plot of the effective permeability $\mu_{eff}$ normalized to the intrinsic permeability $\mu_i$ as a function of the elipticity $\epsilon$.

Referring to the FIGS. 2, 3A and 3B, a variant of the method according to the invention will be descripted in more detail. In this embodiment a magnetic field H with constant amplitude is applied with a direction that changes with time t according to $\phi(t) = \arctan[\epsilon \tan(2\pi t/T)]$. In this case a point P as defined in FIG. 2 moves with a constant speed over an elliptical curve and completes a rotation in T seconds. $\epsilon$ is the elipticity.

If $\epsilon$ approaches 0, the angle $\phi$ is close to 0° or close to 180° during most of the period. This results in an easy axis parallel to the x-axis as defined in FIG. 2, with an effective anisotropy energy $K_{eff}$ close to the intrinsic uniaxial anisotropy energy $K_u$ (see FIG. 3A) and, consequently the effective permeability $\mu_{eff}$ is hardly improved with respect to the intrinsic permeability $\mu_i$ (see FIG. 3B).

If $\epsilon$ increases towards 1, the angle $\phi$ is almost $2\pi t/T$, so the angular velocity $d\phi/dt$ is practically a constant. Only a weak easy axis parallel to the x-axis results, i.e. a high effective permeability $\mu_{eff}$ is obtained with respect to the intrinsic permeability $\mu_i$ (see FIG. 3B).

If $\epsilon$ decreases towards 1, also a high effective permeability is obtained, but now the easy-axis is parallel to the y-axis.

Figure 4:
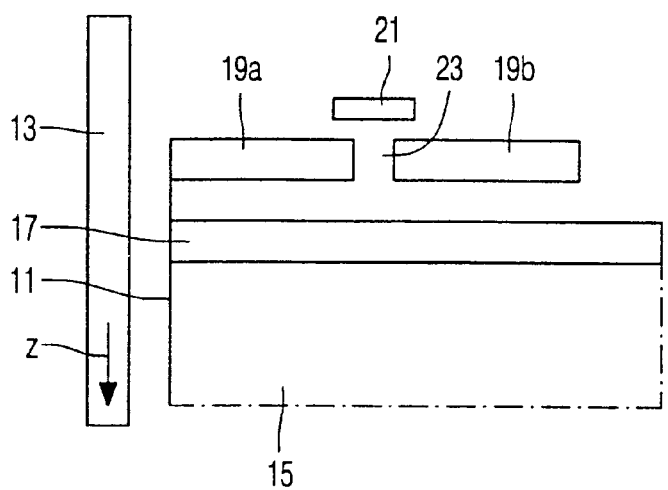
FIG. 4 is a diagrammatic cross-sectional view of an embodiment of the magnetic head manufactured by the method according to the invention.

The magnetic head according to the invention, as shown in FIG. 4 may be a multichannel head or a single channel head. The magnetic head is a thin-film head having a head face 11 for cooperation with a magnetic information or registration medium 13, such as a magnetic tape or disc, which is movable along the head face 11 in a direction z. The magnetic head has a head structure which comprises a non-magnetic substrate 15 of e.g. $Al_2O_3/TiC$ and a thin-film structure. In this example the thin-film structure comprises in this example one or more magnetic yokes each formed by a first flux guide 17, an interrupted second flux guide 19a, 19b and a transducing element 21 bridging a gap 23 between flux guide portions 19a and 19b. The flux guides 17 and 19a, 19b have been formed by deposition of a soft-magnetic material such as an NiFe alloy. The transducing element 21 comprises a magnetically permeable film created by a variant of the method according to the invention. The soft magnetic material deposited during carrying out of the method for forming the element 21 was originally a low permeable material, in this example $Ni_{65}Co_{35}$. However, this material improved in permeability during forming of the magnetically permeable film.

Figure 5:
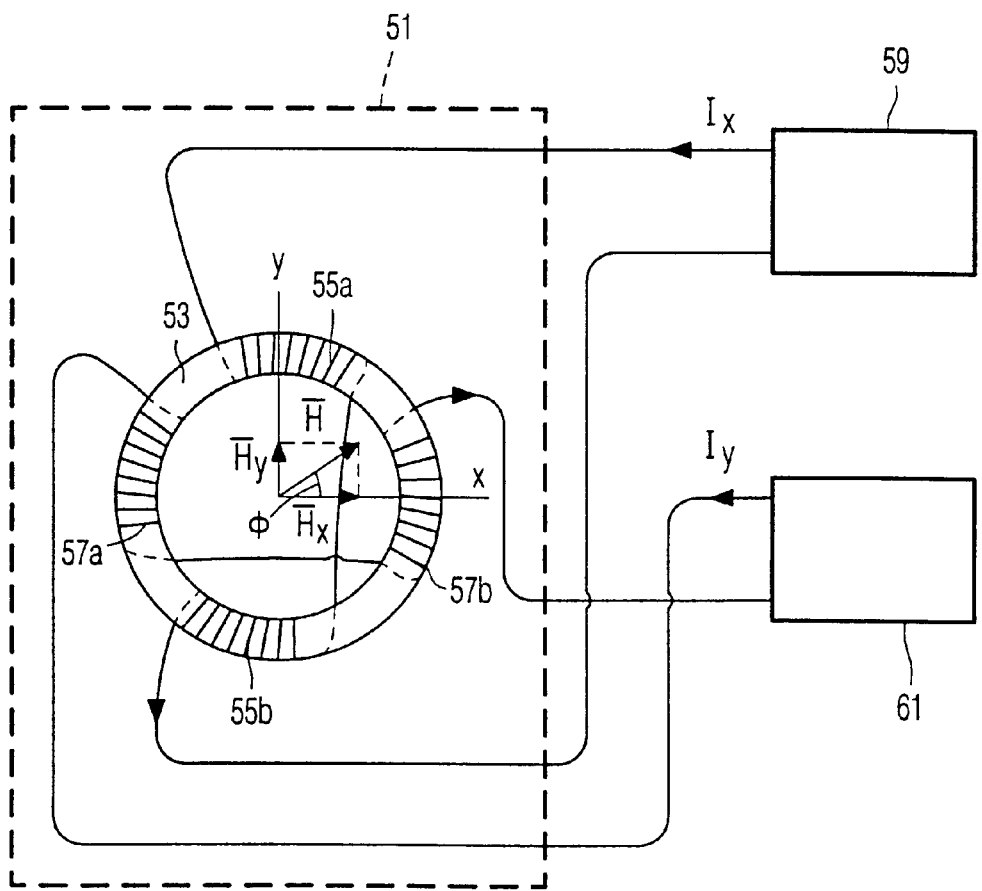
FIG. 5 shows diagrammatically an embodiment of the equipment according to the invention.

The equipment shown in FIG. 5 is suitable for carrying out methods according to the invention. The equipment comprises a deposition chamber 51, e.g. a sputter chamber and an electrical device having a ring-shaped core 53 located in the chamber 51. Two pairs of windings 55a, 55b and 57a, 57b are wound around the core 53, which is a soft-magnetic core, and form a four-coil configuration. Each pair of windings 55a, 55b and 57a, 57b is connected to a power supply, e.g. a direct current source, 59 and 61, respectively. The windings 55a, 55b and 57a, 57b of each pair are located on opposite parts of the core 53 and are, in this example, wound in mutually opposite directions, are connected to one another in a way as shown in FIG. 5 and have, in this example the same number of turns. As can be seen from the drawing, only a small number of feed-throughs are needed to electrically connect the electrical device to the power supply. During driving, each of the pairs of windings 55a, 55b and 57a, 57b generates a magnetic field, the fields Hx and Hy of the pair 55a, 55b carrying the current $I_x$ and the pair 57a, 57b carrying the current $I_y$, respectively. The vector field H thus formed can be given any desired direction during growth of a layer. E.g. currents $I_x \neq 0$ and $I_y=0$ cause a vector field in an x direction; currents $I_y \neq 0$ and $I_x=0$ cause a vector-field in a y direction perpendicular to the x-direction; and currents $I_y=I_x \neq 0$ cause a vector field at an angle ø=45° to the x-direction. In general, the following relation applies in the centre of the core:

ø=arc tan[$H_y/H_x$]+k.180°

=arc tan [($N_yI_y$)/($N_xI_x$)]+k.180°, where k=0 or 1, $N_x$ is the number of turns of each of the windings of the one pair of windings and $N_y$ is the number of turns of each of the windings of the other pair of windings.

It is to be noted that the invention is not limited to the illustrated embodiments.

What is claimed is:

1. A method for creating a magnetically permeable film on a surface of a substrate by deposition on said surface of a magnetic material, during which deposition a magnetic field is present near said surface, which field has a field direction substantially parallel to the surface; said method comprising the steps of:

(i) building up the magnetically permeable film by forming on said surface successive magnetically permeable layers, each by depositing a ferromagnetic material to a thickness maximally corresponding to substantially $$\frac{1}{2}\pi L_{ex},$$

where $L_{ex}$ is equal to $$\sqrt{A/K_u}$$

with A being the exchange constant of the ferromagnetic material and $K_u$ being the uniaxial and anisotropy constant, and (ii) changing the field direction of the magnetic field during formation of each succeeding layer, such change in direction being over an angle other than substantially 180°.

2. A method as claimed in claim 1, wherein:

the magnetically permeable film is formed by successive deposition of at least two magnetically permeable layers; and the field direction of the magnetic field during formation of one of the layers is adjusted to be substantially perpendicular to the field direction during formation of the other layer.

3. A method as claimed in claim 1, wherein during forming of a layer the magnetic field is continuously or intermittently rotated through an angle between 90° and 270° but which is other than substantially 180°.

4. A method as claimed in claim 3, wherein the magnetic field is rotated with a varying angular velocity.

5. A method as claimed in claim 1, wherein the magnetically permeable film is composed of a material comprising one or more of the elements Co, Fe or Ni.

* * * * *